(12) United States Patent
Semel et al.

(10) Patent No.: US 12,591,845 B2
(45) Date of Patent: Mar. 31, 2026

(54) METHOD AND ARRANGEMENT FOR CARRYING OUT CONSTRUCTION MEASURES

(71) Applicant: BAUER Spezialtiefbau GmbH, Schrobenhausen (DE)

(72) Inventors: Matthias Semel, Pfaffenhofen an der Ilm (DE); Andreas Schober, Wertingen (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 401 days.

(21) Appl. No.: 17/768,798

(22) PCT Filed: May 17, 2021

(86) PCT No.: PCT/EP2021/062921
§ 371 (c)(1),
(2) Date: Apr. 13, 2022

(87) PCT Pub. No.: WO2021/239482
PCT Pub. Date: Dec. 2, 2021

(65) Prior Publication Data
US 2024/0102264 A1 Mar. 28, 2024

(30) Foreign Application Priority Data

May 26, 2020 (EP) .................................... 20176471

(51) Int. Cl.
*G06Q 10/087* (2023.01)
*E02F 3/96* (2006.01)

(52) U.S. Cl.
CPC ........... *G06Q 10/087* (2013.01); *E02F 3/968* (2013.01)

(58) Field of Classification Search
None
See application file for complete search history.

(56) References Cited

U.S. PATENT DOCUMENTS

| | | | | |
|---|---|---|---|---|
| 7,856,727 B2* | 12/2010 | Chiorean | .............. | E02F 9/2095 |
| | | | | 33/366.11 |
| 8,195,344 B2* | 6/2012 | Song | ..................... | E02F 9/2008 |
| | | | | 701/2 |

(Continued)

FOREIGN PATENT DOCUMENTS

WO 2016115499 A1 7/2016

OTHER PUBLICATIONS

Goodrum, Paul M., Matt A. McLaren, and Adam Durfee. "The application of active radio frequency identification technology for tool tracking on construction job sites." Automation in construction 15.3 (2006): 292-302 (Year: 2006).*

(Continued)

*Primary Examiner* — Darlene Garcia-Guerra
(74) *Attorney, Agent, or Firm* — Studebaker Brackett PLLC

(57) ABSTRACT

The invention relates to a method and an arrangement for carrying out construction measures, in particular foundation engineering measures, on a construction site with a number n of construction machines, in particular foundation engineering machines, on which attachment components, in particular construction tools, are fixed in a releasable and changing manner, wherein a number N of attachment components are kept on the construction site, wherein N>n>2. Provision is made in that in a computer unit the number n and the type of construction machines and the number N and the type of attachment components present on a construction site are saved, in that the computer unit has a data connection to the individual construction machines and queries information on the actuators of the individual construction machines, in that depending on the information received the computer unit ascertains which attachment component is fixed on the individual construction machine, and in that the (Continued)

computer unit ascertains and indicates which attachment components are freely available on the construction site.

11 Claims, 1 Drawing Sheet

(56) References Cited

U.S. PATENT DOCUMENTS

|                  |   |         |        |   |             |
|------------------|---|---------|--------|---|-------------|
| 9,145,661  | B1* | 9/2015  | Jensen | | E02F 9/265  |
| 2002/0059320 | A1* | 5/2002 | Tamaru | | E01C 19/00  |
| 2005/0002354 | A1* | 1/2005 | Kelly  | | H04L 45/04  |
|              |     |        |        | | 370/329     |
| 2008/0077479 | A1* | 3/2008 | Carter | | G06Q 30/0206 |
|              |     |        |        | | 705/7.34    |
| 2009/0005928 | A1* | 1/2009 | Sells  | | G07C 5/0808 |
|              |     |        |        | | 701/31.7    |
| 2010/0100338 | A1* | 4/2010 | Vik    | | G01M 5/0033 |
|              |     |        |        | | 702/42      |
| 2010/0145865 | A1* | 6/2010 | Berger | | G06Q 10/08  |
|              |     |        |        | | 340/572.1   |
| 2014/0240125 | A1* | 8/2014 | Burch  | | B25H 3/02   |
|              |     |        |        | | 340/539.13  |
| 2016/0160452 | A1* | 6/2016 | Orefice| | E01C 23/01  |
|              |     |        |        | | 701/50      |
| 2016/0300175 | A1* | 10/2016| Talmaki| | G06Q 10/06315 |
| 2016/0379282 | A1* | 12/2016| Hill   | | G06Q 50/01  |
|              |     |        |        | | 705/26.1    |
| 2018/0374168 | A1* | 12/2018| Kano   | | G06Q 50/08  |
| 2020/0263396 | A1* | 8/2020 | Clarke | | B25J 17/0208 |
| 2020/0275240 | A1* | 8/2020 | Vos    | | H04W 4/029  |

OTHER PUBLICATIONS

Naticchia, Berardo, Massimo Vaccarini, and Alessandro Carbonari. "A monitoring system for real-time interference control on large construction sites." Automation in Construction 29 (2013): 148-160 (Year: 2013).*
International Preliminary Report On Patentability and Written Opinion issued in PCT/EP2021/062921; Date of issuance of this report: Nov. 17, 2022.
International Search Report issued in PCT/EP2021/062921; mailed Sep. 14, 2021.

* cited by examiner

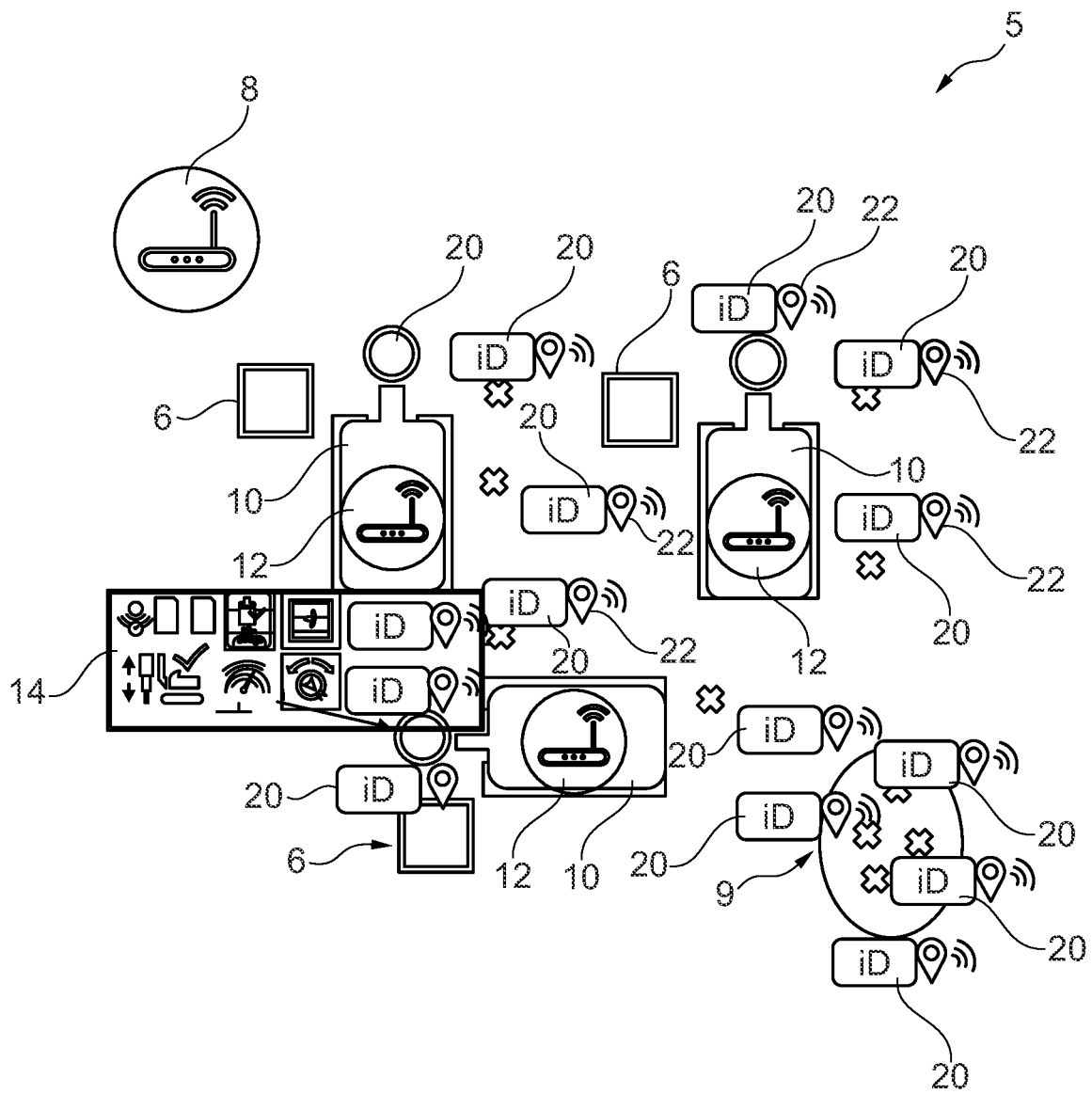

METHOD AND ARRANGEMENT FOR CARRYING OUT CONSTRUCTION MEASURES

The invention relates to a method for carrying out construction measures, in particular foundation engineering measures, on a construction site with a number n of construction machines, in particular foundation engineering machines, on which attachment components, in particular construction tools, are fixed in a releasable and changing manner, wherein a number N of attachment components are kept on the construction site, wherein N>n>2, in accordance with the preamble of claim 1.

Furthermore, the invention relates to an arrangement for carrying out construction measures, in particular foundation engineering measures, on a construction site with a number n of construction machines, in particular foundation engineering machines, on which attachment components, in particular construction tools, are fixed in a releasable and changing manner, wherein a number N of attachment components are kept on the construction site, wherein N>n>2, in accordance with the preamble of claim 8.

When carrying out construction measures it is often necessary to fix different construction tools on a construction machine, e.g. a drilling apparatus, in the course of construction works. For instance, in the case of a drilling apparatus it may be necessary for the production of a borehole that for normal ground an auger is used that enables an efficient and rapid drilling progress under normal ground conditions. On change of a ground layer, for instance when a rock layer is reached, it may be necessary to replace the auger by a rock drill or to use a drilling bucket when gravel layers are reached. In conjunction with this it is known that the individual construction tools are provided with a recognition instrument so that they are recognized automatically by the machine. The machine can have a detection means, for example a transmission and reception means, with which the recognition instrument on the attached construction tool is queried in a wire-based or usually in a wireless manner. In this way, the machine operator can reliably recognize which construction tool is currently fixed. However, not all construction tools are always provided with such a recognition instrument or this is not functioning. Moreover, especially in the case of a radio-based query a clear ascertainment can be affected by other construction tools in close range.

From a control center the information can be retrieved via the individual construction machine as to which construction tool is currently in use on a construction machine. This information is relevant for scheduling work processes on the construction site as it is needed to establish which construction tools are still available and can be used by other construction machines on the construction site.

However, for reliable work scheduling it is not enough to know only the construction tools that are currently mounted on a construction machine. For operation of the construction machine to carry out a specific construction measure in principle further construction tools are also engaged by a construction machine that are currently not mounted on the construction machine but located in close range of the construction machine and required in the near future for a tool change. Hence, a set of several different construction tools can in fact be engaged by a construction machine.

It is known that a construction machine operator notifies a construction site management which set of construction tools is required on the construction machine and therefore not freely available even though individual construction tools are not mounted on the construction machine. However, with this notification made by the construction machine operator it may happen that construction site management is not notified by him at all or is incompletely or incorrectly notified of the construction tools actually required or on completion of a construction measure the availability of individual construction tools is inadvertently not or incorrectly communicated. As a result, an efficient construction site management with work process control and an efficient provisioning of necessary construction tools on a construction site are rendered more difficult.

The invention is based on the object to provide a method and an arrangement, with which a particularly efficient implementation of construction measures on a construction site is rendered possible.

The object is achieved on the one hand by a method having the features of claim 1 and on the other hand by an arrangement having the features of claim 8. Preferred embodiments of the invention are stated in the respective dependent claims.

The method according to the invention is characterized in that in a computer unit the number n and the type of construction machines and the number N and the type of attachment components present on a construction site are saved, in that the computer unit has a data connection to the individual construction machines and queries information on the actuators of the individual construction machines, in that depending on the information received the computer unit ascertains which attachment component is fixed on the individual construction machine and in that the computer unit ascertains and indicates which attachment components are freely available on the construction site.

A basic idea of the invention can be seen in the fact that a method is provided, in which a computer unit can reliably identify a construction tool actually mounted on a construction machine. To this end, the computer unit queries information from the actuators of the individual construction machines, for instance from the drive system, the rotary drives, the linear positioning drives, and on the position of components of the construction machine, for instance of a mast, a rotary drill drive, a boom etc. On the basis of this information the computer unit is designed to determine which construction measure is carried out by the construction machine and based on information stored in a database the computer unit can identify whether and which construction tool is deployed by the construction machine. This information can be used on its own or in connection with further information to determine the deployed and fixed construction tool. In this way, the computer unit can ascertain in a largely automated manner which construction tools are actually deployed by individual construction machines. Through comparison with a predetermined inventory of construction tools ascertainment can be made as to which and how many construction tools are in fact freely available on the construction site.

As a result, on a construction site downtimes caused by missing construction tools on construction machines as well as an excessive inventory of construction tools can be prevented. This leads to substantial cost savings.

An advantageous further development of the invention can be seen in the fact that depending on the information received the computer unit ascertains which set of attachment components is required by the individual construction machine. For this, a method is provided, in which a computer unit can identify not only a construction tool actually mounted on a construction machine but also the further construction tool or tools that are timely required by the respective construction machine to carry out the construction measure.

Basically, the attachment component currently fixed on a construction machine can also be entered manually into the control system by a machine operator so that it can be queried by the computer unit. According to a further development of the invention it is preferred that each construction machine has a detection means with which detection is made as to which attachment component is fixed on the construction machine and/or which one is located in close range. The detection means can be a camera system or a transmission and reception means. By preference, in this case this can only detect the tool directly fixed on the construction machine. However, detection of construction tools in close range of the machine is possible too, although in this case no reliable and clear assignment is possible as to whether a construction tool is actually required for the construction machine or is already fixed on the construction machine. This information is used in combination with the further information on the actuators to reliably determine the required and available construction tools. Thus, by way of the additional information on the construction tool the computer unit can check and verify the determination based on the information from the actuators of the fixed and deployed construction tool.

It is particularly preferred that the attachment components are provided with a machine-readable recognition instrument. A machine-readable recognition instrument on an attachment component can be an RFID-chip for example that can be queried wirelessly. On reception of a corresponding query signal such a recognition instrument allows direct return of a response signal. In this response signal the necessary information on the queried attachment component can be contained. Basically, other recognition instruments can also be deployed.

Another preferred embodiment of the invention resides in the fact that in the computer unit storage is made for each construction machine as to which construction measure is carried out with which set of attachment components and which information on the actuators of the construction machine is to be expected thereby. For instance when producing a foundation pile by a drilling apparatus specific attachment components are required simultaneously or in alternation, such as a Kelly bar, a drilling tool and e.g. also a tool to clean the borehole bottom. These have to be operated in each case with specific rotational speeds and feed rate values.

For example based on the position of the rotary drive along a mast ascertainment can be made as to when which component, such as a tool to clean the borehole bottom, is required. This can be used by the computer unit, which can be arranged in a control center, in order to free up an attachment component or keep it in reserve for a construction machine. Where appropriate a procurement process for one or several further attachment components that are to be transported to the construction site can also be initiated via the central computer unit. In addition, an indication can be displayed to a construction site management as to which attachment components are no longer required for the further construction measures on a construction site and can be removed from the construction site.

According to the invention another preferred method variant resides in the fact that at least one position determination means is provided, with which positions of the construction machines and/or of the attachment components on the construction site are determined and indicated.

Through this a precise localization of the individual construction machines and the individual attachment components can be carried out. For instance when construction tools are available the suitable construction tool can be assigned to a construction machine, with both being located as close as possible to each other. In this way, transport processes within the construction site can be limited which further increases the efficiency of the construction measures to be carried out.

The position determination means can take place via a GPS system or a construction site internal position determination system, in which case the individual machines and components can be equipped with corresponding transmission and/or reception means to emit/receive a position signal.

As construction machines basically all possible construction machines can be provided. For foundation engineering in particular drilling apparatuses, grabs, diaphragm wall cutters, excavators, cranes etc. can be provided. With regard to the attachment components it is preferred that provision is made for a foundation engineering tool, more particularly an auger, a rock drill, a drilling bucket or a pump or a drilling tool. Basically, other foundation engineering tools and other construction tools can also be provided.

The arrangement according to the invention for carrying out construction measures is characterized in that a computer unit is provided, in which the number n and the type of construction machines and the number N and the type of attachment components present on the construction site can be saved, in that the computer unit has a data connection to the individual construction machines and is designed to query information on the actuators of the individual construction machines, in that depending on the information received the computer unit is designed to ascertain which attachment component is fixed on the individual construction machine, and in that it can be ascertained and indicated by the computer unit which attachment components are freely available on the construction site.

With this arrangement the previously described method can be carried out in particular. The advantages described beforehand can be achieved thereby.

According to a further development of the invention it is advantageous that depending on the information received the computer unit is designed to ascertain which set of attachment components is required by the individual construction machine. Hence, the computer unit can identify not only a construction tool actually mounted on a construction machine but also the further construction tool or tools that are timely required by the respective construction machine to carry out the construction measure. This facilitates and improves work scheduling.

In conjunction with this it is particularly preferred that each construction machine has a detection means, with which detection can be made as to which attachment component is fixed on the construction machine and/or which one is located in close range. The detection means can in particular be a transmission and reception means for the wireless query of the attachment components. Based on the additional information thus received the ascertainment of the fixed construction tool can be verified.

According to a further development of the invention it is preferred that each attachment component is provided with a machine-readable recognition instrument. The recognition instrument can in particular be an RFID chip that is fixed at a suitable position of the attachment component.

By linking several sensor information on different attachment devices and by comparing the activity, e.g. rotation, acceleration or inclination, the machine can conclude from the sensor information which attachment device is connected to which other component and which one is ultimately connected to the device. For this purpose, the machine compares the movement information of these sensor systems with the actuators' information from the machine.

For instance after a Kelly bar and the drilling tool have been installed the machine rotates its attachment component with a specific speed. By comparing the rates of rotation of all relevant components the machine detects its installed components and ultimately blocks these components for access of other machines.

By way of the rotational position or orientation of an attachment component, as for example a drilling bucket (upright, horizontal), the machine is able to distinguish which tool at all comes into question for attachment.

A basic idea of the invention is not limited to recognizing which construction tool is installed. Based on the installed or coupled constructional parts/attachment components recognition can be made as to which constructional parts are still available. This is important for construction progress as the tools can thus be utilized more efficiently. This also allows tracking of the tools.

The invention is described in greater detail hereinafter by way of a preferred embodiment. The single FIGURE shows a schematic plan view of a construction site with several construction machines and attachment components.

In the single FIGURE a construction site 5 with an arrangement according to the invention for carrying out construction measures is illustrated schematically. By way of example, three construction machines 10 are provided which are each equipped with a detection means 12 for detection of attachment components 20. The attachment components 20 are construction tools in particular that are provided with a recognition instrument 22. The recognition instrument 22 can in particular be an RFID chip that can be queried by radio via the detection means 12 of the construction machines 10.

The detection means 12 can be part of a control unit of the respective construction machine 10, in which case the control unit also has a wireless data connection to a central computer unit 8.

On each construction machine 10 at least one attachment component 20 is attached to carry out e.g. a specific construction measure or a specific construction step. In addition, further attachment components 20 are kept at an emptying location 6 or in close range to the construction machine 10. These attachment components 20 that are not directly installed are provided for quick exchange on a specific construction machine 10 to carry out a construction measure, for which a specific sequence of work steps with different construction tools or attachment components 20 is intended. The computer unit 8 has a data connection to the individual construction machines 10, whereby information on the actuators of the individual construction machines 10 is queried. Depending on the information received the computer unit 8 ascertains which attachment component 20 is fixed on the individual construction machine 10. These data can be compared with the data of the detection means and checked. This also allows ascertainment as to which attachment components 20 are located in close range but are not fixed on the construction machine 10.

Moreover, in a tool storage 9 further attachment components 20 not in use can be provided that are basically freely available.

In the central computer unit 8 all attachment components 20 on the construction site 5 are listed with a number N. Likewise, a number n of the construction machines 10 on the construction site 5 is saved in the central computer unit 8. By querying the actuators' information and the detection means 12 via the associated control units of each construction machine 10 the central computer unit 8 can determine which specific attachment component 20 is installed on a construction machine 10. By preference, the computer unit 8 can furthermore ascertain which further attachment components 20 are located in close range to each construction machine 10. However, due to close arrangement of the individual construction machines 10 with respect to each other such information is basically insufficient to reliably establish which attachment component 20 in close range to a construction machine 10 is assigned thereto and is also required by the latter in the near future or, as the case may be, is already fixed on the construction machine 10.

Stored in the computer unit 8 for the individual construction measures are the required construction tools or attachment components 20 and their sequence as well as characteristic data on the actuators during use of a respective attachment component 20 on a construction machine 10. This makes it possible for the central computer unit 8 to ascertain or verify which attachment component 20 is in use and which attachment component 20 not fixed on a construction machine 10 is required in the near future by a construction machine 10 and therefore reserved for this construction machine and not freely available. Through comparison with the list of the total attachment components 20 present the computer unit 8 can thus determine which attachment components 20 on the construction site are in fact freely available. This can be taken into consideration in work scheduling by the construction site management or used in the procurement or freeing-up of attachment components 20.

Via a machine control 14 on the construction machines 10 information on the actuators of the construction machine 10, i.e. on vertical feed motion, setting positions of setting cylinders and drives, on rotational speed as well as further information can be queried wirelessly via sensors of the machine and transmitted to the central computer unit 8. Within the meaning of the invention the term actuators is to be understood as adjustable and/or movable components of the construction machine 10 that are activated in order to carry out a construction measure with an attachment component 20.

In addition, via the central computer unit 8 detection can also be made via a non-depicted detection means on the tool storage 9 as to the number and type of attachment components 20 that are kept there and are basically freely available. By the central computer unit 8 the current operation of each construction machine 10 can preferably be ascertained and the requirement of specific attachment components 20 can be determined in good time or even in real time. As a result, attachment components 20 in the tool storage 9 can be reserved or other attachment components 20 on the construction site 5 can be freed up.

Furthermore, the construction machines 10 and the attachment components 20 can be provided with a position determination means so that their precise location on a construction site can be determined. The location can then be displayed as a location plan on a screen on the central computer unit 8 or in each construction machine 10 which is shown in the FIGURE for example.

The invention claimed is:

1. A method for carrying out construction measures on a construction site, the method comprising:

identifying one or more construction measures to be performed on the construction site, wherein the construction measures are foundation engineering measures, wherein the construction site has a number of n construction machines, in particular foundation engineering machines, on which attachment components, in particular construction tools, are fixed in a releasable and changing manner, wherein a number N of attachment components are kept on the construction site, wherein $N > n > 2$;

saving, in a central computer unit, the number n of construction machines and a type of construction machines and the number N of attachment components and a type of attachment components present on the construction site;

establishing a data connection between the central computer unit and a control unit of each of the number n of construction machines;

querying, using the central computer unit, information on actuators of each of the number n of construction machines;

ascertaining, using the central computer unit, based on the information received on the actuators, which attachment component is fixed on each of the number n of construction machines;

saving, in the central computer unit, required attachment components and a sequence to use the required attachment components for carrying out each of the construction measures;

reserving, using the central computer unit, the required attachment components to be used by each of the number n of construction machines based on each of the construction measures carried out by each of the number n of construction machines;

ascertaining, using the central computer unit, which attachment components are freely available on the construction site based on the attachment component fixed on each of the number n of construction machines and the reserved attachment components; and transmitting, using the central computer unit, control commands to the construction machines to detach, reassign, or reconfigure the attachment components based on their availability status.

2. The method according to claim 1, further comprising: ascertaining, using the central computer unit, based on the information received on the actuators, which set of attachment components is required by one of the number n of construction machines to carry out the construction measures.

3. The method according to claim 1, wherein each construction machine has a detection means, with which detection is made which attachment component is fixed on the construction machine and/or which one is located in close range.

4. The method according to claim 1, wherein the attachment components are provided with a machine-readable recognition instrument.

5. The method according to claim 2, further comprising: making, in the central computer unit, a storage for each construction machine and storing, for each of the construction measures, the required attachment components and actuator-related information for each of the number n of construction machines.

6. The method according to claim 1, wherein at least one position determination means is provided, with which positions of the construction machines and/or of the attachment components on the construction site are determined and indicated.

7. The method according to claim 1, wherein as one of the number N of attachment components, a foundation engineering tool, in particular an auger, a rock drill, a drilling bucket or a pump, or a drill rod is provided.

8. A system for carrying out construction measures, in particular foundation engineering measures, on a construction site with a number n of construction machines, in particular foundation engineering machines, on which attachment components, in particular construction tools, are fixed in a releasable and changing manner, wherein a number N of attachment components are kept on the construction site, wherein $N > n > 2$, in particular for carrying out a method according to claim 1, wherein a central computer unit is provided and is designed to save the number n and a type of construction machines and the number N and a type of attachment components present on the construction site, the central computer unit has a data connection to a control unit of each of the number n of construction machines and is designed to query information on actuators of the number n of construction machines, depending on the information received on the actuators, the central computer unit is designed to ascertain which attachment component is fixed on each of the number n of construction machines, the central computer unit is further designed to save required attachment components and a sequence to use the required attachment components for carrying out each of the construction measures, the central computer unit is designed to reserve the required attachment components to be used by each of the number n of construction machines based on each of the construction measures carried out by each of the number n of construction machines, it can be ascertained and indicated by the central computer unit which attachment components are freely available on the construction site based on the attachment component fixed on each of the number n of construction machines and the reserved attachment components, and the central computer unit is designed to transmit control commands to the construction machines to detach, reassign, or reconfigure the attachment components based on their availability status.

9. The system according to claim 8, wherein depending on the information received on the actuators, the central computer unit is designed to ascertain which set of attachment components is required by one of the number n of construction machines to carry out the construction measures.

10. The system according to claim 8, wherein each construction machine has a detection means, with which detection can be made which attachment component is fixed on the construction machine and/or which one is located in close range.

11. The system according to claim 8, wherein each attachment component is provided with a machine-readable recognition instrument.

\*   \*   \*   \*   \*